J. R. RANKIN.
FLUME.
APPLICATION FILED APR. 15, 1912.

1,055,795.

Patented Mar. 11, 1913.
2 SHEETS—SHEET 1.

WITNESSES:
Geo. L. Walker
H. M. Sutton

INVENTOR
John R. Rankin,
BY W. W. Boughton
ATTORNEY

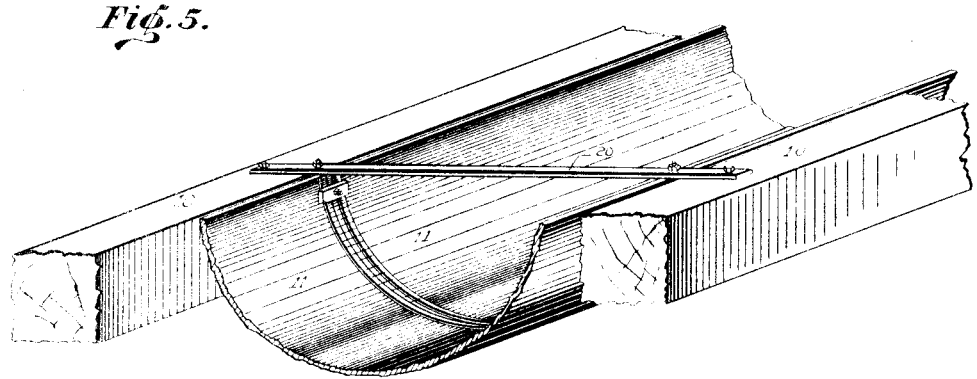
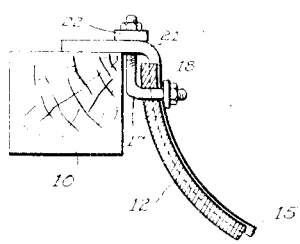
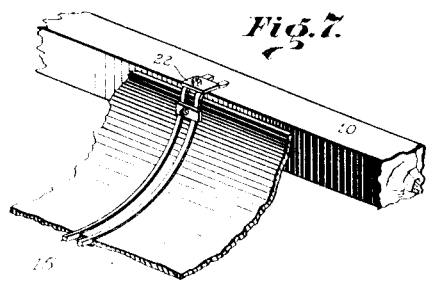
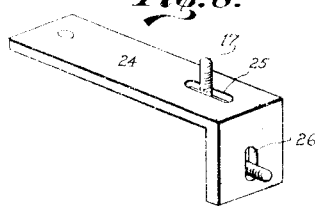
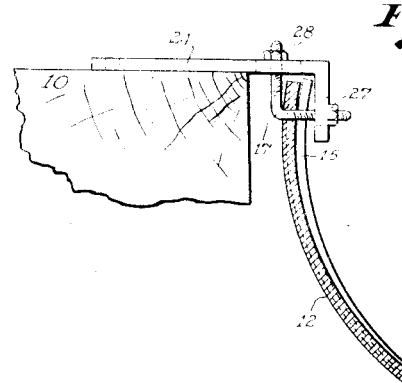

UNITED STATES PATENT OFFICE.

JOHN R. RANKIN, OF PUEBLO, COLORADO.

FLUME.

1,055,795.  Specification of Letters Patent.  Patented Mar. 11, 1913.

Application filed April 15, 1912. Serial No. 690,821.

*To all whom it may concern:*

Be it known that I, JOHN R. RANKIN, a citizen of the United States, residing at Pueblo, in the county of Pueblo and State of Colorado, have invented a certain new and useful Flume, of which the following is a full, clear, and exact description.

This invention is an improvement in flumes which are employed to convey water for power, irrigation or other purposes and relates in particular to the means of forming the joints between the sections of which such flumes are built.

The principal objects of my invention are: to provide a flume joint which has a smooth interior and consequently a low coefficient of friction; to provide a joint which can be made water-tight without the use of rivets or solder; to so design the joint that it may be used with or without cross-beams as desired; to provide a joint obviating severe or abrupt bends of the galvanized metal of which such sections are usually composed, thus avoiding cracking of the coating of the metal; to provide a joint having interior means for forcing the parts into position, thus aiding materially in assembling the parts and absolutely preventing their being displaced by strains placed thereon by the weight of the water contained or stresses set up by expansion or contraction induced by changes of temperature; and to provide a flume which can be assembled independently of the substructure, thus permitting of long lengths of the flume being assembled either at the factory or on the ground below the place of use, which is of importance where the flume is to be used on a high trestle, as assembling is difficult in such position.

Other objects and advantages of my invention will later appear in the specification and be pointed out in the appended claims.

Figure 1:
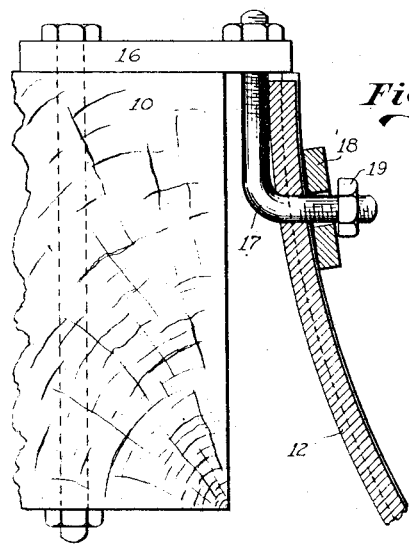
Figure 2:
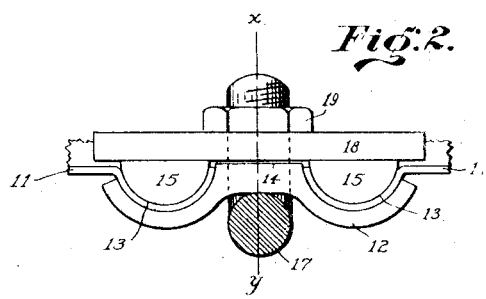
Figure 3:
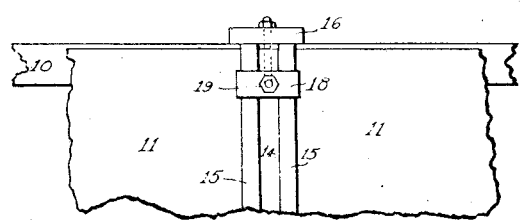
Figure 4:
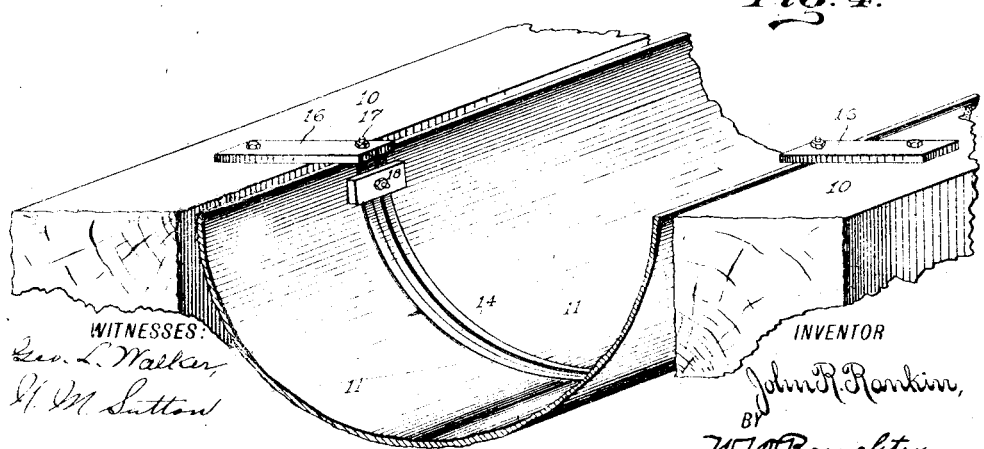

To these ends my invention consists in the means and combinations of parts shown in the accompanying two sheets of drawings in which:

Figure 1 is a vertical section through a stringer and one form of attaching means embodying my invention, the section being taken on the line X—Y of Fig. 2 but showing the L-bolt in elevation; Fig. 2 is a horizontal section of the attaching means shown in Fig. 1, the section being taken just below the supporting plate 16; Fig. 3 is a side elevation, on reduced scale, of the parts shown in Fig. 1, as they appear from the interior of the flume; Fig. 4 is a perspective showing the stringers, two flume sections and the joint in assembled position; Fig. 5 is a perspective, similar to Fig. 4, but illustrating how my invention would be employed with a cross-beam; Fig. 6 is a vertical section through a modified form of joint; Fig. 7 is a perspective of the joint shown in Fig. 6; Fig. 8 shows a still further modification of my invention in which the plates 16 and 18 of the modification of Fig. 1 are joined in a single element; and Fig. 9 is a vertical section showing the modification of Fig. 8 with the parts in position before the nuts are tightened to force the parts of the joint home.

In the drawings, 10, 10, indicate the stringers on which the flume is supported, and 11, 11, the separate, semi-cylindrical sections of metal, preferably galvanized iron, of which the flume is composed. In my form of joint the sections 11, 11, do not abut or overlap but are separated by an " outside shape " 12 which is provided with sockets as shown to receive similarly curved, semi-cylindrical corrugations or beads 13 on the ends of the sections 11, and which is provided with a shoulder 14 to fill the space between the adjacent sheets. Fillets 15, in this instance shown as half-rounds, enter the concave side of the corrugations 13 and hold the sheets firmly seated against the outside shape 12. To this point all the modifications shown are similar, the differences between them residing simply in the means for holding the parts together. In the form shown in Figs. 1 to 4 inclusive a suspension plate 16 is bolted to the stringers 10. An L-bolt, threaded at each end, passes vertically through the suspension plate, and its horizontal arm, passing through the outside shape 12, receives a clamping plate 18 which is long enough to extend over the half-rounds 15. I prefer to so proportion the lengths of the outside shape and the half-rounds that, when assembled, the ends of the half-rounds will project a little above the ends of the outside shape, as clearly shown in Figs. 1 and 3.

In assembling the beads 13 are placed in the sockets in the members 12 and the half-rounds 15 are placed in the beads. Then the horizontal arm of the L-bolt 17 is passed through a bolt hole in the shoulder 14, the plate 18 is placed in position and the nut 19 is turned up to force the half-rounds easily but not tightly into the beads 13. Then the nut on the top of the L-bolt 17 is tightened to draw the parts upward and the half-round, contacting first with the plate 16, is forced securely home in its seat in the beads, thus holding the beads firmly against the outside shape. Then the nut 19 is set to securely hold the parts in position.

Fig. 5 shows how the plates 16 may be continued across the flume to form a cross-beam 20 should a structure embodying a cross-beam be preferred. It will be obvious that this beam may be either timber or metal without in any way departing from my invention.

In Figs. 6 and 7 I have illustrated a modification of my invention especially adapted to small, light flumes. In this form the half-round fillets 15 are extended and bent at 21 as shown, to form horizontal shoulders extending over the stringers 10 and supporting the flume. Free plates 22, resting on the upper surface of the half-rounds, form a bearing for the L-bolt 17. In this construction the wedging action between the parts 12 and 15 is induced by raising the outside shape 12 with relation to the half-rounds 15 by tightening the upper nut on the L-bolt 17. Otherwise the steps of assembling are the same.

In Figs. 8 and 9 I have shown the preferred form of my device—preferred because it can be assembled independently of the supporting structure and because it involves the smallest number of parts. In this form a right angled plate 24 takes the place of the plates 16 and 18 of the form of the invention shown in Figs. 1 to 4. Slots 25 and 26 permit of the passage of the L-bolt 17 and provide for its movements when tightening the joint. When the parts are assembled as shown in Fig. 9 (which it will be obvious may or may not be in relation to the stringer 10) the nut 27 is tightened to force the fillets into position but not to hold the parts absolutely against movement. Then the nut 28 is tightened pulling the remainder of the parts upward, the L-bolt sliding in the slot 26 to accommodate the movement. The fillets 15 extend slightly higher than the outside shape and, contacting first with the under side of the plate 24, are forced securely home. Then the nut 27 is given a final tightening to secure all the parts in position.

The feature of my device which permits the flume sections being out of contact one with the other has, among others, the decided advantage of permitting the introduction between the sections of the L-bolts which coöperate with an interior holding means. This construction enables the device to be easily assembled as described and the interior holding means, when being tightened, positively forces the members home to their seats without the use of clamps or the necessity of pounding or other operations to seat the parts.

Having thus described my invention what I claim and desire to secure by Letters Patent is:

1. In a device of the class described, the combination with two adjoining sections having beads at their ends, of a joining means having two spaced sockets for receiving said beads.

2. In a device of the class described, the combination with two adjoining sections having beads at their ends, of an exterior joining means having two spaced sockets for receiving said beads.

3. In a device of the class described, the combination with two adjoining sections having beads at their ends, of a joining means having two spaced sockets for receiving said beads, and means for forcing the beads into the sockets.

4. In a device of the class described, the combination with two adjoining sections having beads at their ends, of a joining means having two spaced sockets for receiving said beads, and independent means for forcing the beads into their respective sockets.

5. In a device of the class described, the combination with two adjoining sections having beads at their ends, of a joining means having two spaced sockets for receiving said beads, the joining means being so shaped as to give a smooth surface to the interior of the assembled device.

6. In a device of the class described, the combination with two adjoining sections having beads at their ends, of a joining means having two spaced sockets for receiving said beads, the parts being so proportioned that the ends of the sections when assembled are not in contact and the joining means being so shaped as to close the opening between the ends of the sections.

7. In a device of the class described, the combination with two adjoining sections having beads at their ends, of an outside shape having two spaced sockets for receiving said beads and a shoulder intermediate said sockets.

8. In a device of the class described, the combination with two adjoining sections having beads at their ends, of an outside shape having two sockets for receiving said beads and a shoulder intermediate said sockets, and means for holding said beads in said sockets.

9. In a device of the class described, the combination with two adjoining sections having beads at their ends, of an outside shape having two sockets for receiving said beads and a shoulder intermediate said sockets, and fillets for holding said beads in said sockets.

10. In a device of the class described, the combination with two adjoining sections having beads at their ends, of an outside shape having two sockets for receiving said beads and a shoulder intermediate said sockets, fillets for holding said beads in said sockets, and means for forcing said fillets and said beads against the outer shape.

11. In a device of the class described, the combination with two adjoining sections having beads at their ends, of an outside shape having two sockets for receiving said beads and a shoulder intermediate said sockets, fillets for holding said beads in said sockets, and means, operative on the inside of the device, for forcing said fillets and said beads against the outer shape.

12. In a device of the class described, the combination with two adjoining sections having beads at their ends, of an outside shape having two sockets for receiving said beads and a shoulder intermediate said sockets, fillets for holding said beads in said sockets, a bolt passing through said shoulder, and means coöperating with said bolt for forcing the fillets into the beads and the beads against the outside shape.

13. In a device of the class described, the combination with two adjoining sections having beads at their ends, of an outside shape having two sockets for receiving said beads and a shoulder intermediate said sockets, fillets engaging said sockets, the ends of said fillets projecting above the ends of said outside shape, a bolt passing through said shoulder and having an upwardly extending arm, means coöperating with said bolt for forcing the fillets into the beads and the beads against the outside shape, a plate through which the upwardly extending arm of the bolt passes and which is in position to engage the ends of the fillets, and means for drawing the bolt upward to force the fillets against the beads.

14. In a device of the class described, the combination with two adjoining sections having beads at their ends, of an outside shape having a pair of sockets for receiving said beads and a shoulder intermediate said sockets, fillets engaging said beads, the ends of said fillets projecting above the ends of said outside shape, an L-bolt whose horizontal member passes through said shoulder and whose vertical member is in position to engage said outside shape, an angle plate extending over the tops of the outside shape and the fillets and having slots for receiving the ends of the L-bolt, and nuts on the ends of the L-bolt, whereby the tightening of the nuts will force the fillets into the beads, the beads into the sockets and the outside shape against the vertical member of the L-bolt.

15. In a device of the class described, the combination with two adjoining sections, of inner and outer clamping members, the inner clamping members being adapted to force the sections into contact with the outer clamping members, and means acting on the interior of the device and below the ends of the inner clamping members for forcing the inner clamping members home.

16. In a device of the class described, the combination with two adjoining sections, of inner and outer clamping members, the outer clamping member receiving the ends of the sections and holding them out of contact the one with the other, the inner clamping means being adapted to force the sections into contact with the outer clamping means, and means acting on the interior of the device and below the ends of the inner clamping means for forcing the inner clamping means home.

17. In a device of the class described, the combination with two adjoining sections, of exterior joining means receiving the ends of said sections and holding them out of contact one with another, and means passing through the joining means and acting on the interior of the device for forcing the sections into contact with the joining means.

18. In a device of the class described, the combination with two adjoining sections, of exterior joining means receiving the ends of said sections and holding them out of contact one with another, and means passing through the joining means and between the ends of the section for forcing the sections into contact with the joining means.

19. In a device of the class described, the combination with two adjoining sections, of exterior joining means for receiving the ends of said sections and holding them out of contact, fillets engaging said sections, an L-bolt whose horizontal member passes through the joining means and between the ends of the sections and whose vertical member passes through a retaining means, and nuts on the ends of the L-bolt, whereby by tightening the nuts the fillets may be forced horizontally and vertically against the sections.

20. In a device of the class described, the combination with two adjoining sections, of exterior joining means for receiving the ends of said sections and holding them apart, fillets engaging said sections, a slotted angle plate extending over and in front of the ends of the fillets and the joining means, an L-bolt whose horizontal member passes through the joining means between the ends of the sections and through a slot in the vertical member of the angle plate and whose horizontal member passes through a slot in the horizontal member of the angle plate, and nuts on the ends of the L-bolt, whereby by tightening the nuts the fillets may be forced horizontally and vertically against the sections.

21. In a device of the class described, the combination with two adjoining sections having beads at their ends, of an outside shape having a pair of sockets for receiving said beads and a shoulder intermediate said sockets, fillets engaging said beads, an L-bolt whose horizontal member passes through said shoulder and whose vertical member is in position to engage the outside shape, a plate on said bolt adapted to engage said fillets, and a nut on said bolt, whereby the tightening of the nut will force the fillets into the beads, the beads into the sockets and the outside shape against the vertical member of the L-bolt.

22. In a device of the class described, the combination with two adjoining sections having beads at their ends, of an outside shape having a pair of sockets for receiving said beads and a shoulder intermediate said sockets, fillets engaging said beads, an L-bolt whose horizontal member passes through said shoulder and whose vertical member is in position to engage the outside shape, means for supporting said bolt, a plate on said bolt adapted to engage said fillets, and a nut on said bolt, whereby the tightening of the nut will force the fillets into the beads, the beads into the sockets and the outside shape against the vertical member of the L-bolt.

In testimony whereof, I hereunto affix my signature in the presence of two witnesses.

JOHN R. RANKIN.

Witnesses:
 NELLIE M. SUTTON,
 W. W. BOUGHTON.